No. 728,803. PATENTED MAY 19, 1903.
P. LE SUEUR.
COMBINED SEED PLANTER.
APPLICATION FILED JAN. 18, 1900.
NO MODEL. 2 SHEETS—SHEET 1.
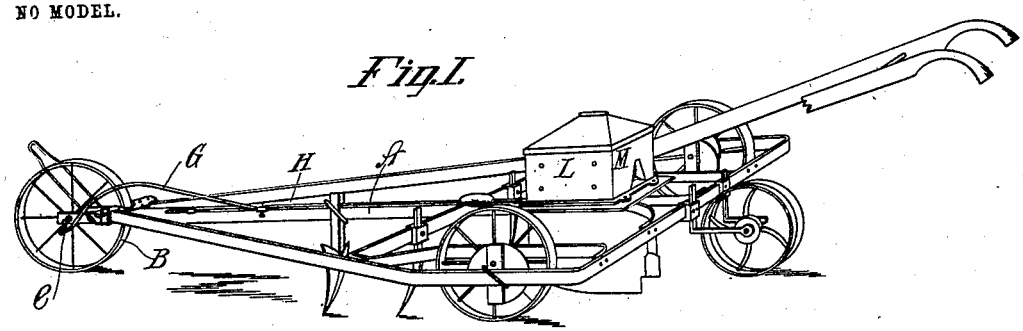
Fig. I.
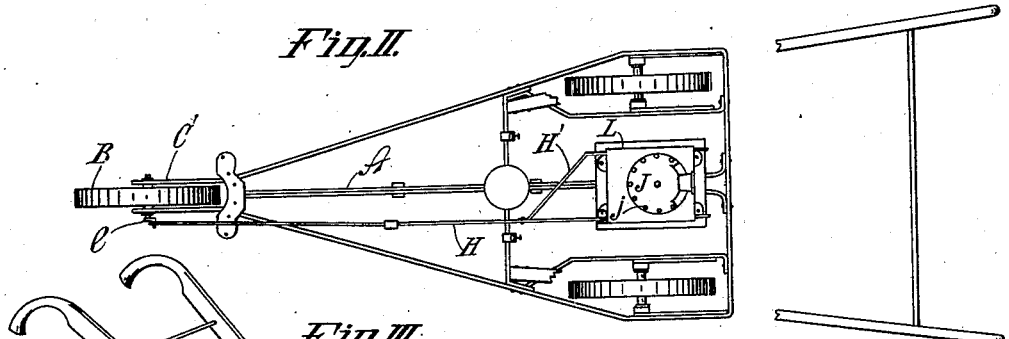
Fig. II.
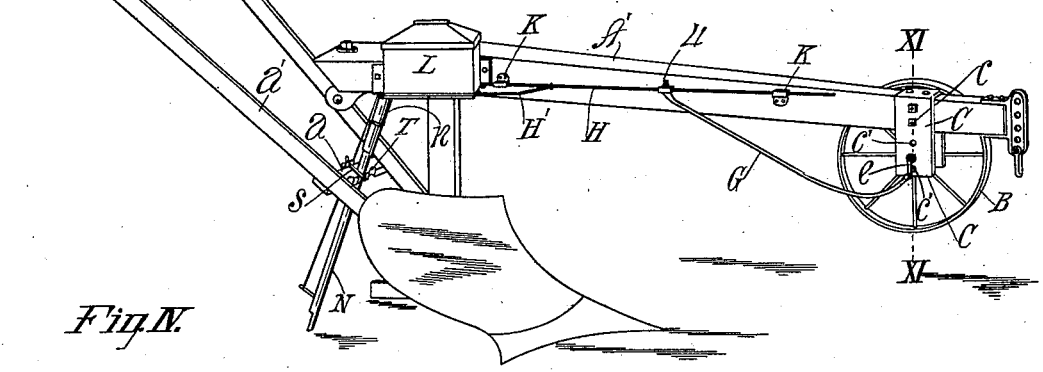
Fig. III.
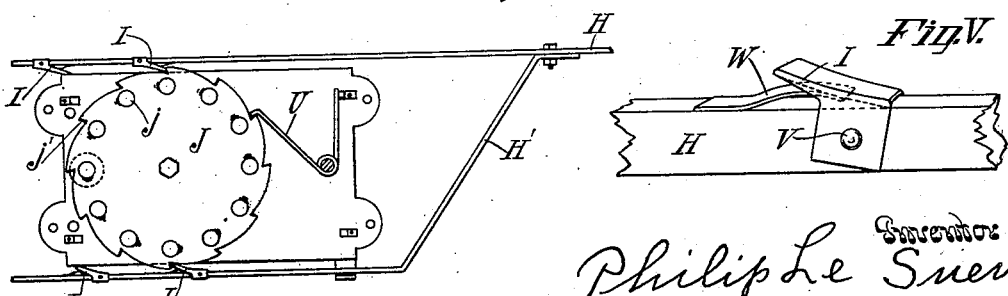
Fig. IV. Fig. V.
Witnesses
Inventor
Philip Le Sueur
by Townsend Bros.
his atty.

No. 728,803. PATENTED MAY 19, 1903.
P. LE SUEUR.
COMBINED SEED PLANTER.
APPLICATION FILED JAN. 18, 1900.
NO MODEL. 2 SHEETS—SHEET 2.
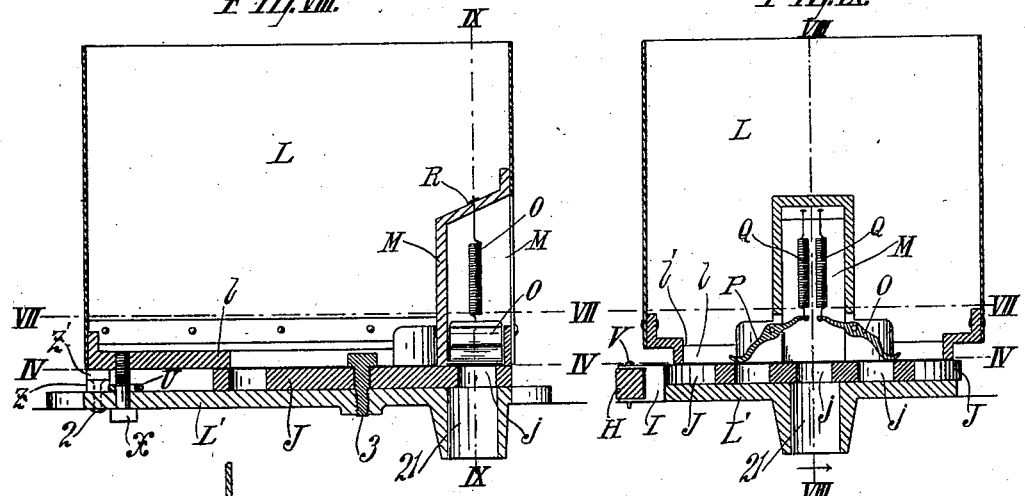
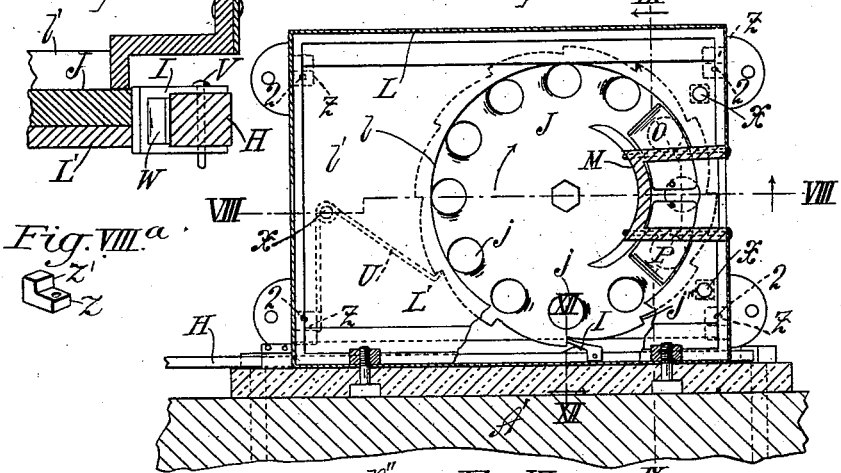
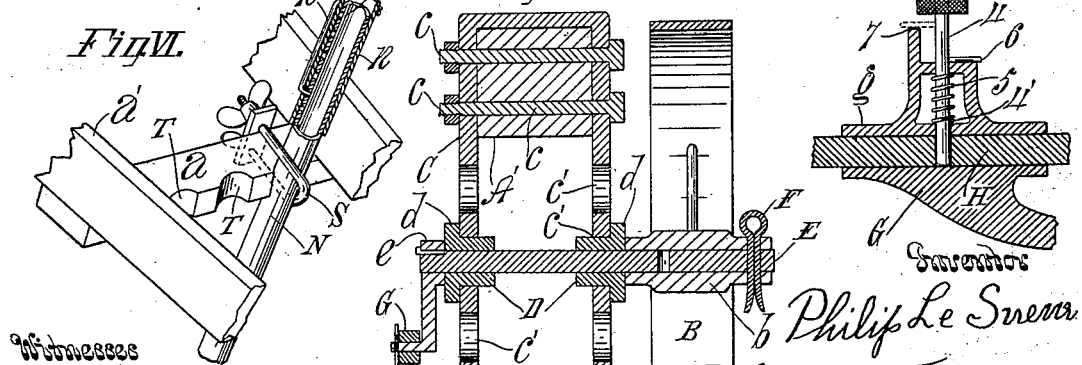

No. 728,803. Patented May 19, 1903.

UNITED STATES PATENT OFFICE.

PHILIP LE SUEUR, OF CALABASAS, CALIFORNIA, ASSIGNOR OF TWO-THIRDS TO WILLIAM C. FRY, OF HOLLYWOOD, CALIFORNIA, AND PHILIP J. HUMMEL, OF LOS ANGELES, CALIFORNIA.

COMBINED SEED-PLANTER.

SPECIFICATION forming part of Letters Patent No. 728,803, dated May 19, 1903.

Application filed January 18, 1900. Serial No. 1,962. (No model.)

*To all whom it may concern:*

Be it known that I, PHILIP LE SUEUR, a citizen of the United States, residing at Calabasas, in the county of Los Angeles and State of California, have invented a new and useful Combined Seed-Planter, of which the following is a specification.

An object of my invention is to provide an improved simple attachment for cultivators and plows, the same being transferable with great ease and facility from cultivator to plow and from plow to cultivator and adapted for planting seeds of various sizes at either the time of breaking the soil or in after cultivation, as may be desired.

Another object of my invention is to provide improved means for a plow or a cultivator by means of which a machine may be produced whereby the soil can be plowed or cultivated to one depth and at the same operation the seeds be planted at another depth and along any desired line in the furrow or in the ground being cultivated.

An object of my invention is to enable the farmer to interchangeably use the seeding device with a common plow, with a cultivator, with a hillside-plow, or with a listing-plow, as occasion may require, so that with the same seeding device which is adapted for level land he is able to plant his corn or other seed in regular rows, following the contour of the hill and while plowing the hillside with his hillside-plow.

My invention relates to the seeding device and the means for actuating the same.

It also relates to a laterally-shifting extensible tube or spout for use in connection with a plow for delivering the seed from the seeding device to the desired depth in the freshly-turned soil and at the desired distance from the landside of the furrow being turned.

Another object of my invention is to provide convenient means for throwing the seeder out of operation.

Another object is to provide improved means for regulating the speed of the dropping-plate.

In my invention I avoid the use of cogs, chains, and large spring-actuated parts and transmit the motion from the drive-wheel to the dropper-plate by a simple crank, with a pitman, a plunger, and detachable dogs carried by the plunger to engage ratchet-teeth on the rim of the dropping-plate and whereby the speed of the dropping-plate is changed by increasing or decreasing the number of dogs used.

When the seeding device is used with a plow, the gage-wheel of the plow serves for the driving-wheel of the seeding device.

The accompanying drawings illustrate my invention.

Figure I is a perspective view of my invention as applied in a cultivator. Fig. II is a plan of the same, a portion of the cultivator-handles being broken away. Fig. III is a view showing the invention as applied to a plow. Fig. IV is a plan of the seeding mechanism on line IV IV, Figs. VIII and IX, showing four detachable dogs for actuating the dropping-plate at a given speed. Fig. V is a detail of one of the dogs for actuating the dropping-plate. Fig. VI is a fragmental detail of the laterally-adjustable seed dropping or discharge tube. Fig. VII is a plan view of the seeding mechanism when three of the dogs shown in Fig. IV have been removed. A fragment of the plow-beam is shown. Fig. VIII is a sectional elevation of the seeding mechanism on irregular line VIII VIII, Fig. VII. Fig. VIII$^a$ is a detail of the supporting-block Z. Fig. IX is a sectional elevation on irregular line IX IX, Fig. VII. Fig. X is a detail of the attachment for detachably connecting the pitman and the dropping-wheel-operating plunger together. Fig. XI is a vertical section on line XI XI, Fig. III, and Fig. XII is a fragmental sectional detail of the hopper-bottom and dropper-plate with dog in place. Line XII XII, Fig. VII, indicates the line of section.

The beam—that is to say, the part of the machine which supports the seeding device—may be variously constructed. In Figs. I and II, A indicates the center beam or bar of the cultivator-frame. In Figs. III, VII, and XI A' indicates the beam of a plow. These beams form the seeder-supports in the two styles of machines illustrated.

My invention in practical use will be mounted upon the beam pertaining to the cultivator, plow, or other machine which is to form a part of the complete planter. The drive-wheel which is to operate the mechanism may also be variously constructed and of various sizes. In the drawings, B indicates such drive-wheel, and it forms the gage-wheel for the plow shown in Fig. III. This drive-wheel may be mounted in any suitable way. In Figs. III and XI it is shown mounted on the plow-beam by means of a carrier C, which is firmly bolted to the plow-beam by bolts c. Said carrier is furnished with a plurality of journal-holes c' to receive bearings or bushings D. (Clearly shown in Fig. XI.) Said bearings are furnished with shoulders d, and the bearings D are inserted into the appropriate journal-holes c', with the shoulders d on the outer side of the carrier. These bearings are kept in position by the crank e on one side of the carrier and by the hub b of the drive-wheel B, which is secured on the other side of the carrier by a linchpin F, which extends through the hub b of the drive-wheel and through the shaft E, which is turned by the wheel B and carries the crank e. The holes c' allow the drive-wheel B to be raised and lowered to regulate the depth of plowing. The drive-wheel may be readily transferred from plow-frame to cultivator-frame, and vice versa, by removing the linchpin F and shaft E and transferring the same, with the bearings D, to the cultivator or plow, as the case may be. The wheel B may be attached to the carrier C or any other suitable supporting device, the bushings or bearings D being applied along with the shaft.

In Figs. I and II, C' indicates a form of carrier for attaching the wheel B to the cultivator-frame.

G indicates a pitman of any suitable form journaled on the crank e, to be driven thereby. Said pitman G is pivotally connected with a device H, which is preferably in the form of a plunger constructed rectangular in cross-section to prevent turning and is furnished with one or more dogs I. In Fig. IV the plunger H is shown furnished with four dogs I, and in Fig. VII the plunger is shown furnished with only one of said four dogs.

J indicates a dropper-plate provided with holes j and with ratchet-teeth j'. Each dog I engages the ratchet-teeth of the dropper-plate J. The main portion of plunger H extends along one edge of the dropper-plate, and its dogs engage the ratchet-teeth on that edge of said plate.

H' indicates a detachable portion of the plunger H, extending on the opposite side of the dropper-plate for the purpose of applying one or more additional dogs to the side of the dropper-plate opposite that upon which the dogs of the main portion H of the plunger operates. The several dogs I are detachably attached to the parts H H' of the plunger, and the speed of rotation of the dropper-plate can be increased or diminished by increasing or decreasing the number of dogs upon the plunger.

In Fig. III the plunger H is carried by bearings K, fastened to the plow-beam, and can be readily slid out of said bearings when the part H' of the plunger is detached from the part H. This allows the plunger, with its dogs, to be transferred from plow to cultivator frame and from cultivator to plow frame.

The drive-wheel, the crank-shaft, and its bearings are designed with a view to being transferred from beam of plow to cultivator, and vice versa, all being detachably held in place by the linchpin F.

L indicates the hopper for supplying the seed to the dropper-plate J.

l indicates the opening in the bottom l' of the hopper L, through which the seeds fall onto the rotating dropper-plate J.

M indicates a recess at the rear end of the hopper and open at the rear and bottom to expose the dropper-plate above the inlet to the tube N. This is clearly illustrated in Figs. VII, VIII, and IX. Said recess allows that portion of the dropper-plate J which carries the seed to come into view at the moment of discharging the seed into the discharge-pipe N, so that the operator can constantly inspect the dropping action.

At the sides of the recess M are gates O P, pivoted, respectively, to the side walls of the recess M. The gate O is the cut-off gate, which cuts off from the body of the seed in the hopper the seed contained in the seed-hole j of the dropper-plate J as said hole passes into the recess M to bring the seed over the seed-discharge hole 21 in the subbottom L' to allow the seed to fall into the discharge-pipe N. This allows the seed to pass through the subbottom and into the discharge-pipe N in full view of the operator, so that any clogging may be instantly detected. The gate P on the side of the recess M toward which the dropper-plate rotates is to prevent clogging.

Q indicates spiral springs attached to the tails of the cut-off gates to hold the gates down firmly upon the top of the dropping-plate J. The springs pass up through the roof of the recess M, and the ends are fastened by pins R. The upper portions of the wires of the springs are straight, and the tension of the springs is easily adjustable by raising or lowering the straight part and exert their force to properly hold the gates in position for the work required.

The seed-dropping spout or tube N is extensible and is adjustably clamped by a clamp S to a bar a, attached to the plow-handles a' for that purpose.

T indicates notches in the bar a for positively securing the tube N in the desired position.

In practical operation by releasing the clamp S the lower portion of the tube N may be moved laterally to bring the bottom end to any position desired. The upper portion of the tube is telescoped, as shown at $n$ in Fig. III. $n'$ indicates the clamp to be inserted into holes $n''$ to hold the tube appropriately extended. By this construction the tube may be adjusted to drop seed either in the furrow near the landside or adjusted laterally away from the landside to drop seed any desired depth in the soil turned over by the action of the plow as it moves onward.

By referring to Fig. XII it will be seen that the dog I is sufficiently wide to extend across the edges of the dropper-plate J and the subbottom L' of the hopper.

The edges of the subbottom L' are tangential to the teeth of the dropper-plate when said teeth are being operated on by the dogs. The dog being wider than the dropping-plate, slides along the edge of the subbottom L' of the hopper, and thus the engagement of the dog with dropper-plate is regulated. The planter is thus provided with means for gagging the depth of engagement of the dogs with the ratchet-teeth of the plate—that is to say, the dog cannot follow the tooth of the plate too far and the plate cannot be pushed too far around by the dog. The seed-hole $j$ is always brought right over the discharge-pipe N when the dog leaves the dropper-plate.

U indicates a ratchet-spring, which catches in the teeth of the dropper-plate J to prevent back action. The dog I is detachably pivoted by a pivot V to the plunger H, and a spring W holds the dog out in its operative position to engage the teeth of the dropper-plate.

The hopper-bottom $l'$ and the subbottom L' are fastened to each other by means of three bolts $x$, and one of said bolts holds the ratchet-spring U in place.

Z indicates supporting-blocks to hold the main hopper-bottom $l$ free from the dropping-plate J. In order to provide an adjustable space to allow the use of a plurality of dropping-plates of different thicknesses, the blocks Z are stepped, and each block is pivoted by a pivot 2 to the subbottom L' at the edge of the hopper. The pivot 2 extends through the lower step of the block Z, so that the upper step $z'$ can be swung out from beneath the hopper-bottom $l$ to allow said bottom to lower to the proper height for a thin dropper-plate (not shown) to be substituted for the thick dropper-plate shown. 3 indicates a bolt which pivots the dropper-plate J to the subbottom.

Referring to Figs. III and X, 4 indicates a latch-pin on a slide $g$, by which the pitman G is detachably connected with the plunger H. 5 indicates a spring engaging a pin 4' on pin 4 for normally holding the catch-pin 4 in position to lock the plunger and pitman together. 6 indicates an arm on the catch-pin 4, and 7 indicates a support for the arm 6. When it is desired to run the plow without operating the seeder, the latch-pin 4 will be drawn out and connected with its arm 6 over the support 7 therefor, thus holding the latch-pin 4 free from the plunger H, so that the pitman G will play freely along the plunger without operating the same.

In order to increase or decrease the speed of rotation of the dropper-plate J, a greater or less number of dogs I will be used. Where it is desired to rotate the dropper at a high speed, the four dogs shown in Fig. IV will be used. For the lowest speed only one dog will be used, as indicated in Fig. VII. To increase the speed from the low speed, one or more additional dogs will be applied, as required. The dogs carried by the auxiliary member H' of the plunger are set in one direction at one edge of the dropper-plate to actuate the dropper-plate J at the rear movement of the plunger, and the dogs on the main portion of the plunger are set in the other direction at the opposite edge of the dropper-plate to operate the plate at the forward movement of the plunger. This arrangement may be reversed, if desired.

In practice the hopper L, with its mechanism, the plunger H, the pitman G, and driving-wheel B, with crank $e$, will be transferred from plow to planter and from planter to plow-frame, as the requirements of the work in hand will make convenient or profitable, and when it is desired to use the plow or cultivator without the seeding devices said devices may be stored until needed.

By reference to Figs. VII and IV the method of increasing the speed of the dropper-plate J without the use of cogs or chains will be understood, in Fig. VII only one dog being used and in Fig. IV four dogs. The appropriate speed for dropping the seed at the desired distances apart is accomplished by using the appropriate number of dogs. This will vary according to the arrangement. For example, one dog may be arranged to enable a fourteen-inch wheel to plant the seed three feet six inches apart, while a sixteen-inch wheel will plant the seed exactly four feet apart. This form of planter is specially designed for check-planting. The power of the driving-wheel is communicated directly to the dropping-plate without the use of cogs, thus to enable the corn to be dropped with absolute certainty.

The carrier C is of inverted-U shape, and the holes $c'$ in its two arms are oppositely arranged at different heights.

The bushings D are set in opposite coaxial holes of the same height with their shoulders $d$ against the outer faces of their respective downwardly-extending arms of the inverted-U shape carrier. The shaft, with crank, is then passed through the bushings and the ground driving-wheel B, thus bringing the crank against one of the bushings and the hub of wheel B against the other bushing. The linchpin F is then inserted to hold all the parts together. The seed-hopper and its appliances being in place and the pitman and plunger properly connected and the pitman journaled on the crank, the machine is ready for operation. The gage-wheel B may be raised or lowered, as may be required for the desired depth of plowing, and by its friction with the ground is caused to turn, thus to actuate the pitman and the dropper mechanism.

What I claim, and desire to secure by Letters Patent of the United States, is—

1. A combined planter comprising a beam for the machine; a driving-wheel detachably connected with the beam; a crank-shaft for the driving-wheel, to be driven thereby; a seeding mechanism detachably fastened to the beam and provided with a ratchet-toothed dropping-plate; a plunger; one or more dogs on said plunger for rotating said plate; slideways for said rod connected with said beam; and a pitman detachably connected with said rod and with said crank.

2. In a planter, the combination with the beam; of a seed-planting mechanism provided with a ratchet-toothed rotary seed-dropping plate; a driving-wheel; a crank driven by said wheel; a plunger provided with one or more dogs for actuating the rotary dropper-plate; slideways for said plunger fastened to said beam; and a pitman-rod connecting the crank with the reciprocating rod.

3. In a planter, the combination of the beam; a driving-wheel carried by the beam to run along the ground; a crank on the shaft of such wheel; a ratchet-tooth dropper-plate; a plunger furnished with a dog to engage the teeth of said dropper-plate; slideways in which said plunger slides; a pitman connected at one end with the crank and furnished at the other end with a sleeve to slide on the plunger; and means for detachably connecting the sleeve with the plunger.

4. In a seed-planter, the combination of the toothed dropper-plate; a plunger furnished with one or more dogs extending in one direction at one edge of the dropper-plate; a detachable auxiliary extension of said plunger extending along the opposite edge of the dropper-plate and furnished with dogs extending in a direction opposite the first-named dogs; and means for reciprocating said plunger.

5. The combination of the hopper having a main bottom and a subbottom; a dropper-plate to rotate between the main bottom and subbottom, the main bottom being provided with a hole to admit seeds to the face of the dropper-plate, and the subbottom being furnished with a hole for the escape of the seed; means for rotating the dropper-plate, a recess being formed in the rear of the hopper above the opening in the subbottom; gates pivoted in the recess at the opposite sides thereof; and spiral springs connected with said gates, respectively and furnished respectively with a straight portion extending up through the top of the recess-wall and there fastened to adjust the tension of the springs.

6. In a seed-planter, the combination with the planter-frame; of the hopper; the dropper-plate at the bottom of the hopper; means for rotating the dropper-plate; a subbottom provided with a hole through which the seeds are dropped; a tube to conduct the seeds to the ground; and means for adjusting the lower part of said tube laterally.

7. In a planter, the combination with the seeding device and the planter-frame, of a notched bar; a laterally-adjustable dropper-tube; and a clamp for clamping said tube in the notches respectively of said bar.

8. The combination with a plow-beam, of a carrier fastened to said beam and furnished with two downwardly-projecting arms provided with oppositely-arranged holes at different heights; two bushings, one for each of said holes, and each provided with a projection fitting against the outside of the carrier, said bushings being arranged coaxially; a driving-wheel; a shaft extending through said bushings and through the driving-wheel and furnished at one end with a crank engaging the outer face of one of the bushings; means for holding the driving-wheel rigidly on the shaft in engagement with the outside of the other bushing; a plunger furnished with one or more dogs; guides for said plunger; a pitman connecting the crank with the plunger; a hopper; and a dropper-plate for said hopper furnished with ratchet-teeth with which the dog or dogs of the plunger engage.

9. A planter comprising a ground-wheel; a crank connected with the ground-wheel to be turned thereby; a plunger playing in guideways and furnished with a dog or dogs to operate the dropper-plate of the planter; a pitman connected with the crank at one end and furnished at the other end with a sleeve to play along the plunger; and a latch for fastening the pitman and the plunger together.

10. In a combined planter, the combination with wheeled frame of a seed-hopper, having a dropping-plate with ratchet-shaped teeth on its outer periphery, a device having a dog which engages with ratchet-teeth, engagement of said dog with ratchet-teeth, regulated by means of the edge of a subbottom provided below the dropping-plate, substantially as described.

11. In a combined planter, the combination with wheeled frame of a seed-hopper, having a dropping-plate with ratchet-teeth on its outer periphery, a rearwardly-opening recess in rear end of hopper, a cut-off gate, with visible spiral spring in said open recess, and an anticlogging-gate, substantially as described.

12. In a combined planter, the combination with a wheeled frame; of a seed-hopper having a dropping-plate with ratchet-teeth on its outer periphery; a hold-back spring acting on the dropping-plate; and spacing-pieces on the wheeled frame providing for thick and thin dropping-plates for interchangeable use for a plurality of dropping-plates.

13. The combination of a plow-beam; bearings attached to the plow-beam; a gage-wheel carried by the plow-beam; a shaft for the wheel; a crank on said shaft; a plunger working in said bearings; a dropper-plate having ratchet-teeth; a dog on the plunger to engage said teeth; a ratchet-spring to catch said teeth; and a pitman connecting the crank and the plunger.

14. In a planter, the combination of a ground-wheel; a crank on the shaft of said ground-wheel; a dropper-plate furnished with ratchet-teeth; a reciprocating member furnished with detachable dogs to engage said ratchet-teeth; and a pitman connecting the crank with the reciprocating member.

15. In a planter, the combination with the dropper-plate furnished with ratchet-teeth, of a reciprocating member furnished with detachable dogs to engage the ratchet-teeth of the dropper-plate; and means for operating the reciprocating member whereby the speed of the dropper-plate may be increased or decreased by increasing or decreasing the number of detachable dogs, substantially as and for the purpose set forth.

16. In a planter, the combination with the beam, of plunger bearings or slideways on the beam; a dropper-plate; a plunger provided with one or more detachable dogs to rotate the dropper-plate; a pitman-rod; a slide-piece and a latch connecting said pitman with the plunger; and a drive-wheel provided with a crank to operate the pitman.

17. In a planter, the combination with the beam, of a seed-hopper furnished with a main bottom and a subbottom; a ratchet-toothed dropper-plate; a plunger with detachable dogs; and means for gaging the depth of engagement of the dogs with the ratchet-teeth of the plate.

18. The combination of a seed-hopper with a cut-off gate and an anticlogging-gate, each of which gates is mounted in an outwardly-opening recess and respectively furnished with a spiral spring mounted in said recess and thereby made visible to the operator; and means for independently adjusting the tension of said springs, respectively, and having spacing-pieces provided for thick and thin dropping-plates, substantially as and for the purpose set forth.

19. A planter comprising a plow beam or frame; a planter mechanism; a vertically-adjustable gage-wheel at the front end of the plow-beam for gaging the depth of the plow; and adjustable means connecting said gage-wheel with the planter mechanism, whereby the gage-wheel serves the double purpose of driving the planter mechanism and gaging the depth of the plow.

20. A planter comprising a plow furnished with an adjustable gage-wheel to regulate the depth of the plow; a seed-tube vertically adjustable relative to the plow by means of which the depth at which the seeds are deposited is regulated independently of the depth of plowing.

21. A planter comprising a plow furnished with a vertically-adjustable gage-wheel; planter mechanism operatively connected with said gage-wheel by adjustable means which allows the gage-wheel to be raised and lowered; and an independently-adjustable seeding-tube, whereby the plowing can be at a great depth and the seeding at a less depth.

22. The combination with a plow; of planting mechanism, a laterally-adjustable seeding-tube and means for adjusting said tube laterally relative to the plow and to its furrow whereby the location of the row of seeds deposited can be adjusted relative to the line of the furrow.

23. In a planter, the combination with an ordinary plow-beam; of a seed-hopper having a ratchet-toothed dropper-plate and a discharge-hole; a seeding-tube or discharge-pipe flexibly in connection with the discharge-hole and composed of two parts; means provided whereby the lower part may be adjusted out of perpendicular and away from landside; and means for rigidly attaching said lower part of the discharge-pipe to the plow-beam.

24. In a planter, the combination with a plunger; of a ratchet-toothed dropper-plate-actuating dog embracing said plunger and pivoted by a pivot to the plunger, substantially as and for the purpose set forth.

25. The combination with the hopper having a main bottom and a subbottom; of the stepped blocks Z respectively pivoted by pivots 2 which extend respectively through the lower steps of their respective blocks into the subbottom so that the upper step can be swung out from beneath the main hopper-bottom to allow said bottom to lower; whereby the hopper is adapted for the use of thick and thin dropper-plates.

26. In a planter, the combination of a beam; with the hopper furnished with a main bottom and subbottom; means provided whereby the subbottom gages the depth of the engagement of detachable dogs on plunger with the ratchet-teeth on dropper-plate; an auxiliary extension of said plunger; and means provided for detaching same, substantially as described.

PHILIP LE SUEUR.

Witnesses:
J. B. ROWE,
A. M. BEEK.